(12) United States Patent
Elliott et al.

(10) Patent No.: US 6,621,648 B2
(45) Date of Patent: Sep. 16, 2003

(54) LOOK AHEAD WRITE PRECOMPENSATION

(75) Inventors: Carl F. Elliott, Eden Prairie, MN (US); John D. Leigthon, Anoka, MN (US); Daniel J. Galaba, Roseville, MN (US); Thomas K. Adams, Burnsville, MN (US); Sally A. Doherty, Afton, MN (US)

(73) Assignee: Agere Systems Inc., Allentown, PA (US)

( * ) Notice: Subject to any disclaimer, the term of this patent is extended or adjusted under 35 U.S.C. 154(b) by 310 days.

(21) Appl. No.: 09/845,365

(22) Filed: Apr. 30, 2001

(65) Prior Publication Data

US 2002/0159176 A1 Oct. 31, 2002

(51) Int. Cl.⁷ .............................. G11B 5/09; G11B 5/02
(52) U.S. Cl. ............................ 360/45; 360/46; 360/51; 360/68
(58) Field of Search .............................. 360/45, 46, 51, 360/67, 68

(56) References Cited

U.S. PATENT DOCUMENTS 6,288,858 B1 * 9/2001 Arnett et al. ................. 360/45
6,288,859 B1 * 9/2001 Bergmans et al. ............ 360/46
6,369,661 B1 * 4/2002 Scott et al. .................... 331/45

OTHER PUBLICATIONS

"Write Precompensation Method for Magnetic Current Amplitude or Rise–Time Modulation", IBM Technical Disclosure Bulletin (NB91038), Sep. 1, 1991, vol. 34 pp. No. 38–40.*

* cited by examiner

Primary Examiner—Regina N. Holder
(74) Attorney, Agent, or Firm—Kinney & Lange, P.A.

(57) ABSTRACT

A plurality of data bits are magnetically recorded on a medium (such as a magnetic disk in a disk drive system) by creating a write bubble region encroaching on the medium. The write bubble region has a magnetic polarity that is reversed in a pattern that corresponds to the values of the data bits being recorded on the medium. The timing of the reversing of the magnetic polarity of the write bubble region is adjusted by a precompensation system to ensure that the recorded data bits are evenly spaced on the medium. The timing adjustment is made by the precompensation system based on a state of at least one data bit previously recorded on the medium and on a state of at least one data bit to be subsequently recorded on the medium.

13 Claims, 5 Drawing Sheets

| DELAY | D[n-2] | D[n-1] | D[n] | D[n+1] | D[n+2] |
|---|---|---|---|---|---|
| NOMINAL DELAY TO CENTER TIMING | | | | | |
| DELTA 1 | 0 | 0 | 1 | 0 | 0 |
| DELTA 2 | 0 | 0 | 1 | 0 | 1 |
| DELTA 3 | 0 | 0 | 1 | 1 | 0 |
| DELTA 4 | 0 | 1 | 1 | 0 | 1 |
| DELTA 5 | 0 | 1 | 1 | 0 | 0 |
| DELTA 6 | 0 | 1 | 1 | 1 | 1 |
| DELTA 7 | 0 | 1 | 1 | 1 | 0 |
| DELTA 8 | 1 | 0 | 1 | 0 | 1 |
| DELTA 9 | 1 | 0 | 1 | 0 | 0 |
| DELTA 10 | 1 | 0 | 1 | 1 | 1 |
| DELTA 11 | 1 | 0 | 1 | 1 | 0 |
| DELTA 12 | 1 | 1 | 1 | 0 | 1 |
| DELTA 13 | 1 | 1 | 1 | 0 | 0 |
| DELTA 14 | 1 | 1 | 1 | 1 | 1 |
| DELTA 15 | 1 | 1 | 1 | 0 | 0 |
| DELTA 16 | 1 | 1 | 1 | 1 | 1 |

USED IN LOOK BEHIND METHOD TO DETERMINE TIMING SHIFT: D[n-2], D[n-1]

USED IN LOOK AHEAD METHOD TO DETERMINE TIMING SHIFT (IN ADDITION TO LOOK BEHIND BITS): D[n+1], D[n+2]

FIG. 4

LOOK AHEAD WRITE PRECOMPENSATION

BACKGROUND OF THE INVENTION

The present invention relates to precompensation of magnetic transitions written to a medium such as a disk, and more particularly to an apparatus and method for shifting the timing of a magnetic transition to compensate for a timing irregularity occurring due to limited write bubble velocity in a high data rate magnetic recording system.

In magnetic data recording systems such as disk drives, data are recorded on the medium (i.e., magnetic disk) as a series of magnetic field transitions. In many typical systems, a magnetic transition represents a binary "1" while the lack of a magnetic transition represents a binary "0." A magnetic field is typically created by passing a current through a write head adjacent to the medium, creating a "write bubble" which defines a region in which the magnetic field is sufficiently strong to be magnetically recorded on the medium. Magnetic transitions are created by reversing the direction of current flowing through the write head.

The process of reversing the direction of current flowing through the write head requires a finite amount of time, often referred to as the "rise time" of the write driver employed by the head. The "write bubble" field created by the head correspondingly contracts as the current is reduced to zero and expands as the current in the opposite direction increases to its steady-state value. The time required for the write bubble to expand to its steady-state dimensions is referred to as the "flux rise time" of the head.

In high performance disk drive systems, the data recording rate can be high enough that the write bubble is unable to fully expand to its steady-state dimensions when the data to be recorded requires two or more consecutive magnetic transitions. As a result, the location of the magnetic transition (which is defined by the location of the trailing edge of the write bubble when the write bubble expansion velocity is equal to the linear velocity of the media) is displaced from the ideal location of the transition edge by some non-linear amount. This phenomenon is known as a "non-linear transition shift" (NLTS) in the magnetic transition pattern. These transition shifts can potentially cause errors in reading data from the disk, effectively limiting the data recording rate of the disk drive to a level at which the magnitude and frequency of occurrence of transition shifts are sufficiently low to ensure accurate data recovery from the disk.

A NLTS in the magnetic transition pattern of a disk drive system may also be caused by the magnetic interaction between the write bubble field and the demagnetization field of nearby magnetic transitions recorded on the disk. This phenomenon has been observed and accounted for in prior art magnetic recording systems by a process known as precompensation. When a current data bit to be recorded requires a magnetic transition, the magnetic recording system examines the bits that were previously recorded. If the previous bits were magnetic transitions, then the timing of the current transition bit is adjusted to ensure that the transition is located properly on the medium, compensating for the effect of the demagnification field of the previous transition bits on the write bubble field used to record the current transition bit. This known precompensation strategy may be referred to as a "look behind" precompensation technique, since timing adjustments are made on the basis of the characteristics of previously recorded data bits.

A NLTS that occurs due to a high data recording rate and limited "flux rise time" of the write head can only be compensated for by looking at future data bits to be recorded since the location of the first magnetic transition in a series of transitions tends to be affected by this phenomenon. However, there are no existing magnetic recording systems that take this phenomenon into account, and there are no existing magnetic recording systems that employ a "look ahead" precompensation technique. Such a technique is the subject of the present invention.

BRIEF SUMMARY OF THE INVENTION

The present invention is a precompensation system that adjusts the timing of magnetic transitions recorded on a medium based on the state of previous data bits recorded on the medium (look-behind precompensation) and on the state of data bits to be subsequently recorded on the medium (look-ahead precompensation). A plurality of data bits are magnetically recorded on a medium (such as a magnetic disk in a disk drive system) by creating a write bubble region encroaching on the medium. The write bubble region has a magnetic polarity that is reversed in a pattern that corresponds to the values of the data bits being recorded on the medium. The timing of the reversing of the magnetic polarity of the write bubble region is adjusted by a precompensation system to ensure that the recorded data bits are properly placed on the medium. The timing adjustment is made by the precompensation system based on a state of at least one data bit previously recorded on the medium and on a state of at least one data bit to be subsequently recorded on the medium.

BRIEF DESCRIPTION OF THE DRAWINGS

FIG. 4 is a chart illustrating an exemplary addressing scheme for delays stored in a lookup-table.

DETAILED DESCRIPTION

Figure 1:
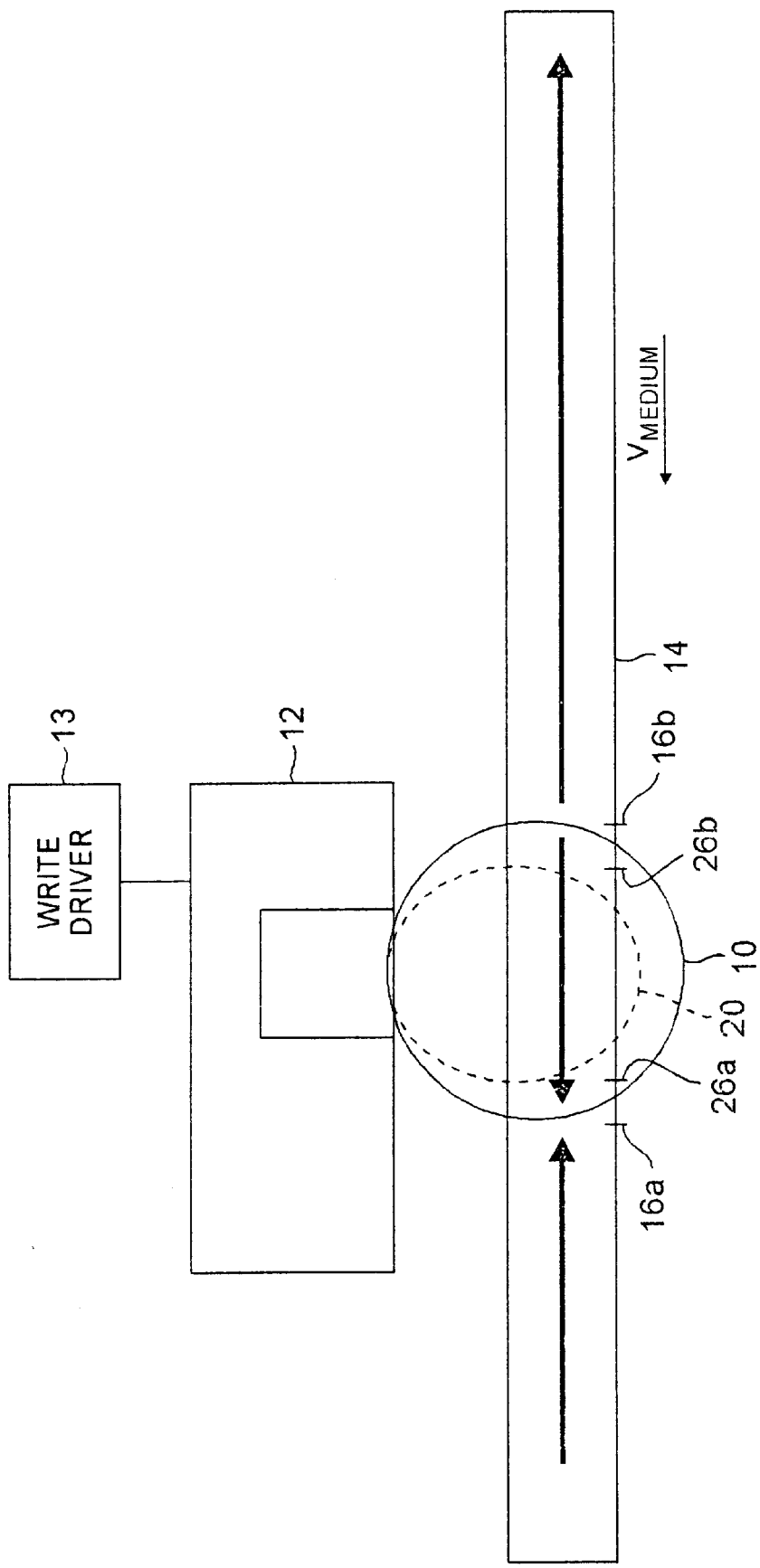
FIG. 1 is a diagram illustrating the write bubble created by a write head to magnetically record information on a medium.

FIG. 1 is a diagram illustrating "write bubble" 10 created by write head 12 to magnetically record information on disk 14. Write head 12 is configured in a manner well known in the art, and is operable with appropriate write driver circuitry 13 to generate magnetic fields of first and second opposite polarities in response to binary data signals for recording onto disk 14. A data encoding scheme well known in the art is the Non-Return-to-Zero Inverted (NRZI) encoding scheme, in which a magnetic transition recorded on the disk signifies a binary "one" and the lack of a magnetic transition recorded on the disk signifies a binary "zero." The region in which the magnetic field is generated is shown as write bubble 10, which is defined as the region in which the magnetic field generated by write head 12 is strong enough to magnetically record on disk 14. Write bubble 10 extends to lateral edges 16a and 16b on disk 14. The tracks of disk 14 move past write head 12 in a direction and at a velocity indicated by the arrow labeled Vmedium. The arrows shown on disk 14 indicate the direction of magnetization of the disk, as recorded by the magnetic field in write bubble 10.

As data recording rates continue to increase, the ideal writing scenario shown in FIG. 1 cannot necessarily be achieved. Write bubble 10 requires a finite amount of time to reach its nominal size shown in solid lines in FIG. 1. When the data recording rate is increased to a certain level, the write bubble is not able to reach its nominal size before a subsequent data bit is to be recorded. If the subsequent data bit is a binary zero, which is encoded by the lack of a magnetic transition, then the write bubble can continue to expand until it reaches its nominal size and no error will occur. However, if the subsequent data bit is a binary one, which is encoded by a magnetic transition, the write bubble must contract and expand again with a field of the opposite polarity, meaning that only write bubble 20 is obtained as shown in dashed lines for the current binary bit being recorded. As a result of write bubble 20 being smaller than the nominal size of write bubble 10, the edges of the write bubble on disk 14 move from edges 16a and 16b (for nominal write bubble 10) to edges 26a and 26b (for write bubble 20). The location of the first magnetic transition in a series of magnetic transitions is therefore displaced on disk 14, which can cause errors in the recovery of the data from disk 14 in a subsequent read process.

In order to ensure that magnetic transitions are properly located on disk 14 in the high data rate recording system described above, the magnetic flux transition speed of write head 12 must be increased or the timing of the magnetic transition must be adjusted in situations where transition displacement would occur. The magnetic flux transition speed of write head 12 is generally already as fast as can be feasibly designed, meaning that selective timing adjustments of magnetic transitions must be made in order to support a high data recording rate. Since these timing adjustments are made in anticipation of displacement of data, the timing adjustment scheme is referred to in the art as a precompensation scheme.

Precompensation schemes are known in the art to adjust the timing of magnetic transitions that are affected by interactions between magnetic transition fields generated by the write head and the demagnetization fields of nearby magnetic transitions recorded on the disk. These interactions result in a non-linear transition shift (NLTS) in a magnetic transition that is written following one or more magnetic transitions. The precompensation scheme operates to adjust the timing of the magnetic transition when one or more magnetic transitions were previously written, so that the data is recorded on the disk at consistent and precise intervals and can therefore be read from the disk without errors. Since the precompensation scheme examines previously written data to determine whether to adjust the timing of a magnetic transition, this type of scheme may be referred to as a look-behind precompensation scheme.

Figure 2:
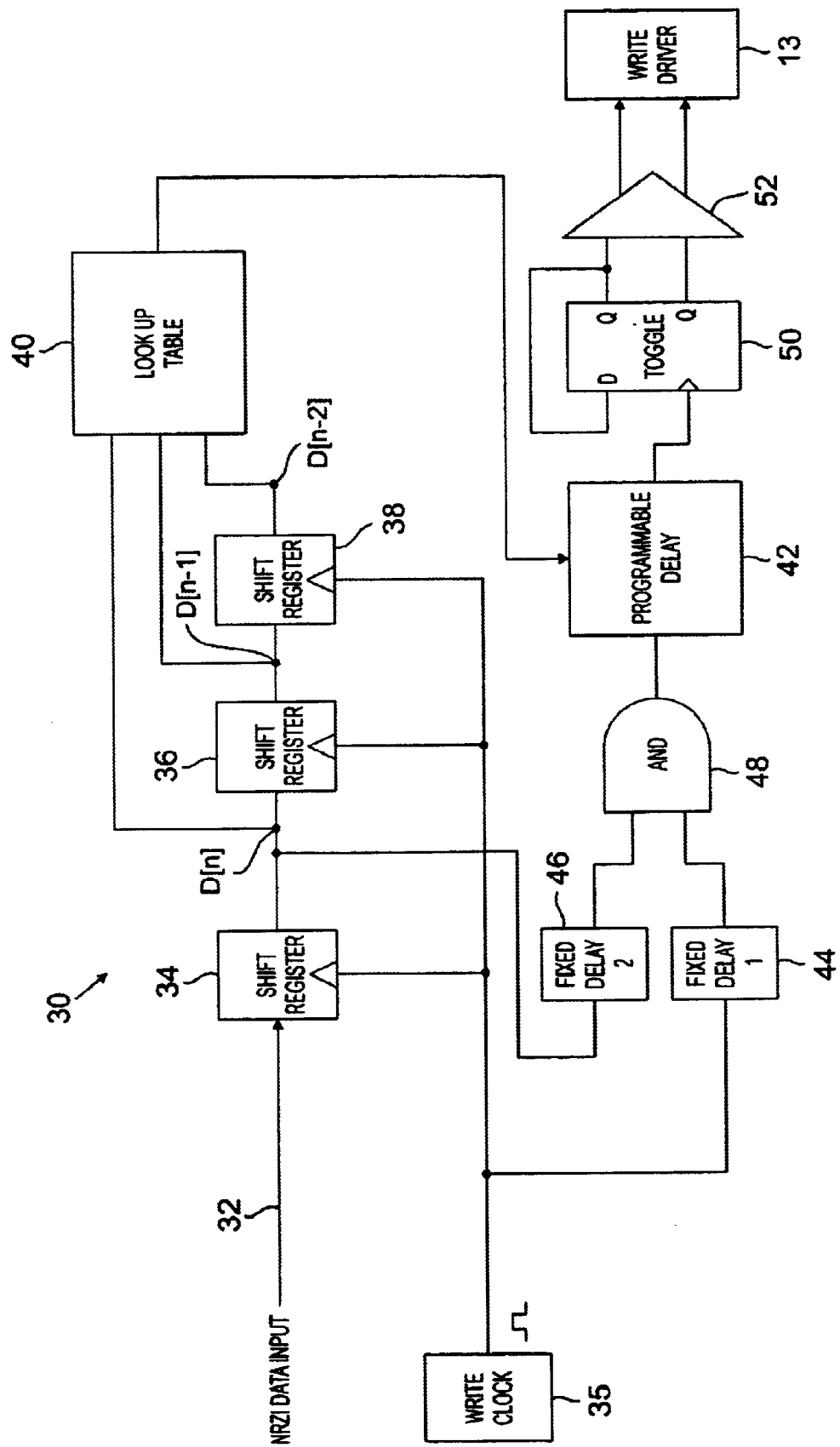
FIG. 2 is a block diagram of a prior art write control circuit employing a look-behind precompensation scheme.

FIG. 2 is a block diagram of write control circuit 30 employing a look-behind precompensation scheme in a manner known in the art. An NRZI data input stream is received by write control circuit 30 on line 32, which is input to shift register element 34. The NRZI data input stream is a series of binary ones and zeroes at high and low logic levels, respectively, as is generally known in the art. Shift register element 34 is clocked by write clock 35, and is configured to shift the data input stream by zero clock cycles. The output of shift register element 34 therefore has a current state that corresponds to the data bit to be immediately recorded, and can be represented as D[n]. The output of shift register element 34 is input to shift register element 36, which is clocked by write clock 35 and is configured to shift the data input stream by one clock cycle in the negative (earlier in time) direction. The output of shift register element 36 therefore has a current state that corresponds to the data bit recorded one clock cycle earlier, and can be represented as D[n−1]. The output of shift register element 36 is input to shift register element 38, which is clocked by write clock 35 and is configured to shift the data input stream by one additional clock cycle in the negative (earlier in time) direction. The output of shift register element 38 therefore has a current state that corresponds to the data bit recorded two clock cycles earlier, and can be represented as D[n−2]. Shift register elements 34, 36 and 38 thus make up a three bit shift register, and the outputs of shift register elements 34, 36 and 38 are input to lookup table 40. Lookup table 40 contains a plurality of addressable entries corresponding to appropriate delays to be introduced into the current data bit based on the values of the current data bit and the two previously recorded data bits. The output of lookup table 40 is connected to programmable delay circuit 42 to implement the delay indicated by the appropriately addressed entry of lookup table 40.

Write clock 35 is input to fixed delay circuit 44, and the D[n] output of shift register element 34 is input to fixed delay circuit 46. The outputs of fixed delay circuits 44 and 46 are input to AND gate 48, which has an output connected to programmable delay circuit 42. The output of AND gate 48 is therefore active (high) only when both write clock 35 is in a high state and when the current state of the data stream D[n] is high, indicating that a magnetic transition is to be written. Fixed delay circuits 46 and 48 are provided to compensate for the inherent latencies of shift register elements 34, 36 and 38 and lookup table 40. Programmable delay circuit 42 introduces a delay that is based on the state of the current data bit, D[n], and of the previous two data bits, D[n−1] and D[n−2]. The output of programmable delay circuit 42 is connected to the clock input of flip-flop 50. Flip-flop 50 is a toggle, D-type flip-flop having its Q' output connected to its D input, with its Q output and its Q' output connected to output stage 52. The differential signal provided by output stage 52 to write driver circuit 13 is therefore in an appropriate form, such as positive emitter coupled logic (PECL), for controlling write driver 13 to operate the write head to selectively record magnetic transitions on the disk.

Figure 3:
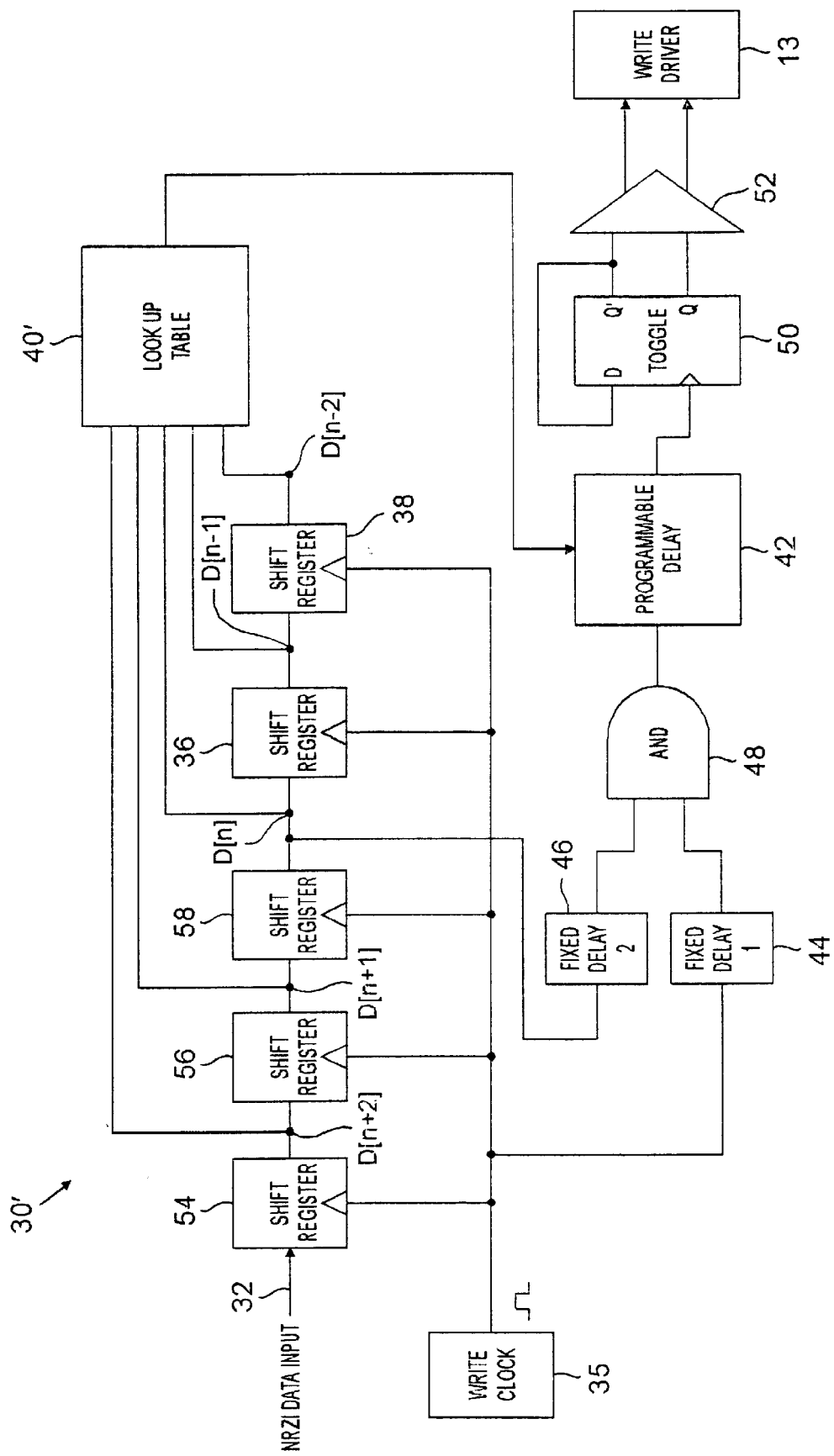
FIG. 3 is a block diagram of a write control circuit employing a look-behind and look-ahead precompensation scheme according to the present invention.

FIG. 3 is a block diagram of write control circuit 30' employing a look-behind and look-ahead precompensation scheme according to the present invention. Write control circuit 30' utilizes a number of components that are identical to the components utilized by look-behind write control circuit 30 shown in FIG. 2, and those common components are referred to in FIG. 3 by the same reference numerals as were used in FIG. 2. An NRZI data input stream is received by write control circuit 30' on line 32, which is input to shift register element 54. Shift register element 54 is clocked by write clock 35, and is configured to shift the data input stream by two clock cycles in the positive (later in time) direction. The output of shift register element 54 therefore has a currents state that corresponds to the data bit to be recorded two clock cycles in the future, and can be represented as D[n+2]. The output of shift register element 54 is input to shift register element 56, which is clocked by write clock 35 and is configured to shift the data input stream by one clock cycle in the negative (earlier in time) direction. The output of shift register element 56 therefore has a current state that corresponds to the data bit to be recorded one clock cycle in the future, and can be represented as D[n+1]. The output of shift register element 56 is input to shift register element 58, which is clocked by write clock 35 and is configured to shift the data input stream by one clock cycle in the negative (earlier in time) direction. The output of shift register element 58 therefore has a current state that corresponds to the data bit to be immediately recorded, and can be represented as D[n]. The output of shift register element 58 is input to shift register element 36, which in turn has an output that is connected to the input of shift register element 38. Shift register elements 36 and 38 are configured in the same manner as was described above with respect to FIG. 2, with the current state of the output of shift register element 36 corresponding to the data bit recorded one clock cycle earlier (D[n−1]), and the current state of the output of shift register element 38 corresponding to the data bit recorded two clock cycles earlier (D[n−2]). Shift register elements 54, 56, 58, 36 and 38 thus make up a five bit shift register, and the outputs of shift register elements 54, 56, 58, 36 and 38 are input to lookup table 40'. Lookup table 40' contains a plurality of addressable entries corresponding to appropriate delays to be introduced into the current data bit based on the values of the current data bit, the two previously recorded data bits and the two data bits to be subsequently recorded. The output of lookup table 40' is connected to programmable delay circuit 42 to implement the delay indicated by the appropriately addressed entry of lookup table 40'.

As described above with respect to FIG. 2, write clock 35 is input to fixed delay circuit 44 and the D[n] output of shift register element 58 is input to fixed delay circuit 46. The outputs of delay circuit 44 and 46 are input to AND gate 48, which has an output connected to programmable delay circuit 42. The output of AND gate 48 is therefore active (high) only when both write clock 35 is in a high state and when the current state of the data stream D[n] is high, indicating that a magnetic transition is to be written. Fixed delay circuits 46 and 48 are provided to compensate for the inherent latencies of shift register elements 54, 56, 58, 36 and 38 and lookup table 40'. Programmable delay circuit 42 introduces a delay that is based on the states of the current data bit, D[n], the previous two data bits, D[n−1] and D[n−2], and the next two data bits, D[n+1] and D[n+2], and has an output connected to the clock input of flip-flop 50. Flip-flop 50 is a toggle, D-type flip-flop having its Q' output connected to its D input, with its Q output and its Q' output connected to output stage 52. The differential signal provided by output stage 52 to write driver circuit 13 is therefore in an appropriate form, such as PECL, for controlling write driver 13 to operate the write head to record magnetic transitions on the disk.

Magnetic transitions (binary ones) recorded on the disk when the previous data bit or bits also were magnetic transitions (binary ones) tend to be shifted to an earlier location on the disk than the nominal location of recording would occur. For the purpose of this discussion, an "earlier location" should be understood as a location on the disk that would cause the transition to be read earlier in time by a read head than would nominally occur. Thus, in order to ensure accurate spacing on the disk of all data bits (and thus accurate reading of data from the disk), a positive delay (moving the magnetic transition later in time) must be introduced for the recording of these magnetic transitions. Conversely, magnetic transitions (binary ones) recorded on the disk when the subsequent data bit or bits also will be magnetic transitions (binary ones) tend to be shifted to a later location on the disk than the nominal location of recording would occur. Again, for the purpose of this discussion, a "later location" should be understood as a location on the disk that would cause the transition to be read later in time by a read head than would nominally occur. Thus, in order to ensure accurate spacing on the disk of all data bits (and thus accurate reading of data from the disk), a negative delay (moving the magnetic transition earlier in time) must be introduced for the recording of these magnetic transitions. For a particular state of the previous, current and future data bits, the net delay required could be negative, which is not a practical delay that can be introduced into the recording circuit. Therefore, lookup table 40' is configured to control programmable delay circuit 42 in such a manner to introduce a nominal delay for recording data bits that would require no shifting, that is, where the current data bit is a magnetic transition (binary one) and the two previous data bits and two future data bits are all binary zeroes, represented by the absence of a magnetic transition. A smaller delay is therefore introduced to compensate for the effects of future magnetic transitions (effectively moving the current magnetic transition earlier in time), and a larger delay is introduced to compensate for the effects of previous magnetic transitions (effectively moving the current magnetic transition later in time).

FIG. 4 is a chart illustrating an exemplary addressing scheme for the delays indicated by lookup table 40'. As discussed above, a nominal delay is introduced when the current bit is a binary one and the two previous and two subsequent bits are all binary zeroes. Fifteen other delay values are introduced for various states of the data bits, as indicated by Delta 1–6 and Delta 8–16. The actual values of these delays will be obtained by an empirical analysis of the performance of the particular disk drive in which the precompensation system of the present invention is employed.

Figure 5:
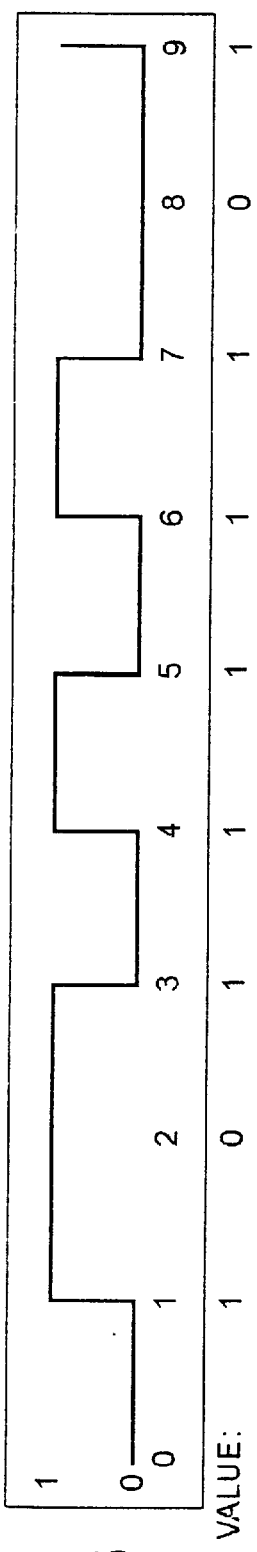
FIG. 5 is a timing diagram illustrating the nominal timing of a data input stream with no precompensation.

FIG. 5 is a timing diagram illustrating the nominal timing of a data input stream with no precompensation. The data stream illustrated in FIG. 5 has binary bit values of 011111101, with a magnetic transition indicating a binary one and the lack of a magnetic transition indicating a binary zero. As described above, the phenomena of interactions between current magnetic transitions and the demagnetization field of previously recorded magnetic transitions, and of limitations in the finite magnetic flux rise time of the write bubble, can displace the location of magnetic transitions on the disk. As a result, compensating the timing of the data input stream from the nominal timing shown in FIG. 5 is necessary to ensure accurate spacing of data on the disk.

Figure 6:
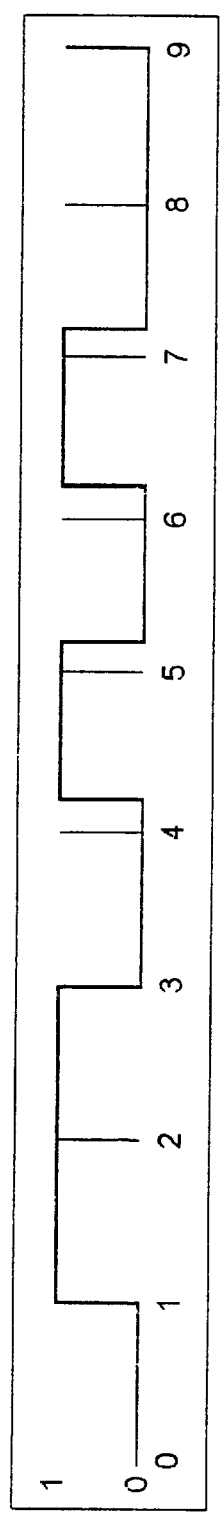
FIG. 6 is a timing diagram illustrating the data input stream of FIG. 5 having timing that is compensated by prior art look-behind precompensation circuitry.

FIG. 6 is a timing diagram illustrating the data input stream of FIG. 5 having timing that is compensated by prior art precompensation circuitry (such as is shown in FIG. 2) to account for the effect of interactions between current magnetic transitions and the demagnetization field of previously recorded magnetic transitions. Specifically, the magnetic transitions of data bits 4, 5, 6 and 7 are moved back in time with respect to the nominal timing of those bits to compensate for this effect. The particular amount of time that data bits 4, 5 , 6 and 7 are shifted depends on empirical testing of the disk drive in which the precompensation scheme is employed, with those delay amounts being stored in lookup table 40 (FIG. 2).

Figure 7:
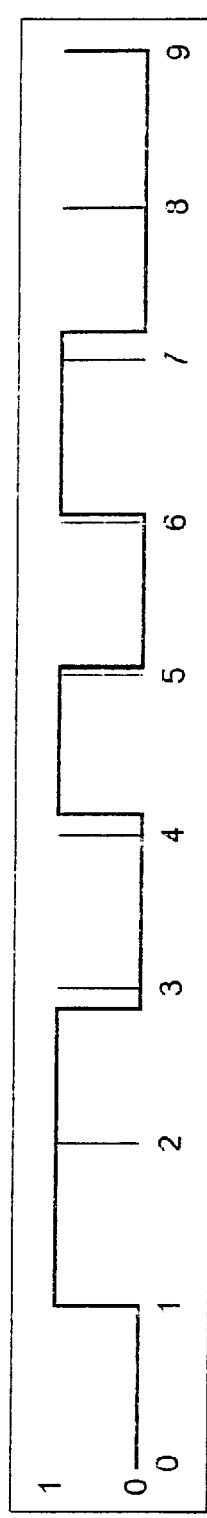
FIG. 7 is a timing diagram illustrating the data input stream of FIG. 5 having timing that is compensated by look-behind and look-ahead precompensation circuitry according to the present invention.

FIG. 7 is a timing diagram illustrating the data input stream of FIG. 5 having timing that is compensated by precompensation circuitry according to the present invention (such as is shown in FIG. 3). The precompensation circuitry of the present invention accounts for both the effects of interactions between current magnetic transitions and the demagnetization field of previously recorded magnetic transitions, and the effects of limitations in the finite magnetic flux rise time of the write bubble. Specifically, the magnetic transition of data bit 3 is moved earlier in time with respect to the nominal timing of that bit to compensate for the effect of limitations in the finite magnetic flux rise time of the write bubble. The magnetic transition of data bit 7 is moved back in time with respect to the nominal timing of that bit to compensate for the effect of interactions between current magnetic transitions and the demagnetization field of previously recorded magnetic transitions. The magnetic transitions of data bits 4, 5 and 6 are moved back in time (although the net movement in time could be earlier in another exemplary disk drive) with respect to the nominal timing of those bits to compensate for both of the effects on the magnetic transitions. The particular amount of time that data bits 3, 4, 5 , 6 and 7 are shifted depends on empirical testing of the disk drive in which the precompensation scheme of the present invention is employed, with those delay amounts being stored in lookup table 40' (FIG. 3) and addressed to correspond to delay amounts in a manner such as is shown in FIG. 4. The effect of moving magnetic transitions earlier in time may be achieved, as described above with respect to FIG. 4, by introducing a nominal delay for bits which require no shifting in time, and by introducing delays that are larger or smaller than the nominal delay to shift the timing from the nominal timing.

The present invention provides a precompensation scheme for a disk drive that accounts for a non-linear transition shift (NLTS) that occurs either due to interactions between current magnetic transitions and the demagnetization field of previously recorded magnetic transitions or due to limitations in the finite magnetic flux rise time of the write bubble generated by the write head. This is achieved in an exemplary embodiment by introducing a delay in the recording of magnetic transitions that is based on the state of the current bit being recorded, the two previous bits being recorded, and the subsequent two bits to be recorded. It should be understood that the number of bits examined in order to determine an appropriate shift of the timing of the current bit may be any number of one or more bits, and that the system described as examining the states of the two previously bits and the two subsequently recorded bits is merely an exemplary embodiment. The combined "look-behind" and "look-ahead" precompensation of the present invention therefore ensures that all data bits are recorded on the medium with equal spacing for accurate reading of the data by a read head. In an exemplary embodiment, the circuit for implementing the precompensation scheme of the present invention may be realized as an integrated circuit (IC).

Although the present invention has been described with reference to preferred embodiments, workers skilled in the art will recognize that changes may be made in form and detail without departing from the spirit and scope of the invention.

What is claimed is:

1. A method of magnetically recording a plurality of data bits on a medium, the method comprising:

creating a write bubble region encroaching on the medium, the write bubble region having a magnetic polarity;

reversing the magnetic polarity of the write bubble region in accordance with values of the data bits being recorded on the medium; and adjusting a timing of the reversing of the magnetic polarity of the write bubble region based on a state of at least one data bit previously recorded on the medium and on a state of at least one data bit to be subsequently recorded on the medium.

2. The method of claim 1, wherein the step of adjusting the timing of the reversing of the magnetic polarity of the write bubble region comprises:

determining a state of a current data bit being recorded on the medium;

determining a state of at least one data bit previously recorded on the medium;

determining a state of at least one data bit to be subsequently recorded on the medium; and introducing a delay in recording the current data bit based on the state of the current data bit, the state of the at least one data bit previously recorded on the medium and the state of the at least one data bit to be subsequently recorded on the medium.

3. The method of claim 2, wherein the step of introducing the delay in recording the current data bit comprises:

retrieving an addressed entry of a lookup table based on the state of the current data bit, the state of the at least one data bit previously recorded on the medium and the state of the at least one data bit to be subsequently recorded on the medium; and controlling a programmable delay circuit based on the retrieved entry of the lookup table.

4. The method of claim 2, wherein the step of introducing the delay in recording the current data bit comprises:

introducing a nominal delay in recording the current data bit when the state of the at least one data bit previously recorded on the medium and the state of the at least one data bit to be subsequently recorded on the medium are not magnetic transitions.

5. The method of claim 2, wherein the steps of determining the states of the current data bit, the at least one data bit previously recorded on the medium and the at least one data bit to be subsequently recorded on the medium comprise:

receiving a data input stream in a shift register comprising a plurality of shift register elements; and outputting the states of the current data bit, the at least one data bit previously recorded on the medium and the at least one data bit to be subsequently recorded on the medium from the plurality of shift register elements.

6. The method of claim 5, further comprising:

introducing a fixed delay in recording the current data bit to account for latencies of the shift register elements.

7. A disk drive write system for magnetically recording a plurality of data bits on a medium, the disk drive write system comprising:

a write head for creating a write bubble region encroaching on the medium, the write bubble region having a magnetic polarity;

a write driver operatively connected to the write head for controlling the write head to reverse the magnetic polarity of the write bubble region in accordance with values of the data bits being recorded on the medium; and a precompensation circuit operatively connected to the write driver for adjusting a timing of the reversing of the magnetic polarity of the write bubble region based on a state of at least one data bit previously recorded on the medium and on a state of at least one data bit to be subsequently recorded on the medium.

8. The disk drive write system of claim 7, wherein the precompensation circuit comprises:

a programmable delay circuit operable to introduce a delay in recording the current data bit based on the state of theat least one data bit previously recorded on the medium and on a state of the at least one data bit to be subsequently recorded on the medium.

9. The disk drive write system of claim 8, wherein the precompensation circuit further comprises:

a lookup table containing a plurality of addressable entries for controlling the programmable delay circuit, the entries being addressed based on the state of the at least one data bit previously recorded on the medium and on a state of the at least one data bit to be subsequently recorded on the medium.

10. The disk drive write system of claim 9, wherein an entry in the lookup table addressed to correspond to a situation when the state of the at least one data bit previously recorded and the state of the at least one data bit to be subsequently recorded are not magnetic transitions controls the programmable delay circuit to introduce a nominal delay in recording the current data bit.

11. The disk drive write system of claim 9, wherein the precompensation circuit further comprises:

a shift register comprising a plurality of shift register elements each having outputs operatively connected to the lookup table.

12. The disk drive write system of claim 11, further comprising:

at least one fixed delay circuit connected to introduce a fixed delay in recording the current data bit to account for latencies of the shift register elements.

13. The disk drive write system of claim 7, wherein the precompensation circuit is implemented as an integrated circuit (IC).

* * * * *